UNITED STATES PATENT OFFICE.

ROBERT O. LOWREY, OF SALEM, NEW YORK.

IMPROVED PROCESS FOR RENDERING PAPER, CLOTH, AND THE LIKE FIRE AND WATER PROOF.

Specification forming part of Letters Patent No. 71,892, dated December 10, 1867.

*To all whom it may concern:*

Be it known that I, ROBERT O. LOWREY, of Salem, in the county of Washington and State of New York, have invented certain new and useful Improvements in Rendering Articles Fire and Water Proof; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in a novel process of treating fibrous and similar materials for rendering them both fire and water proof.

This invention is intended to be applied to cloth or paper, and all similar fabrics or material, either before or after the same has been manufactured.

In the first place, I saturate or otherwise treat the material with liquid starch—that is, starch dissolved in water—and then subject it afterward to the action of a compound consisting of milk, one pint; vinegar, one pint; and quicklime, pulverized, one pound, all added together and left until the lime is thoroughly slaked, when it will be found to have formed a pasty mass.

This compound may be applied to the material in any convenient manner, or, if preferred, as in some cases it will be, as being more convenient, this compound and the starch may be united and then applied to the fabric or material, either before or after the material is manufactured.

In the manufacture of paper for all the various purposes to which it may be adapted, it will be most convenient to apply the starch and other ingredients forming the compound to the pulp previous to its being formed into sheets.

In the manufacture of cloth and all knitted, woven, or felted fabrics, it may be applied to the yarn or thread previous to its being woven or knit, or to the wool before it is felted.

Paper or cloth already manufactured may be treated by the compound, and they thus rendered fire and water proof in a very simple and inexpensive manner.

In case it is desired to treat cloth intended to be used for wearing-apparel, and in which case it is desired to leave the pores open, the compound will be rendered thinner or more liquid by the application of more water and subjecting the cloth to a pressure or squeezing, for the purpose of removing the surplus, which would otherwise tend to fill up and close the pores or interstices.

It is obvious that the invention may be applied to garments already made up, or to all such as are usually starched, by either adding the lime compound to the starch before applying it to the garments or by treating them with it after the starch has been applied, in the usual manner.

This forms an exceedingly cheap and convenient means of rendering articles fire and water proof, the ingredients being always accessible.

In my experiments I have ascertained that similar results may be produced by substituting for the starch a solution of gelatine or animal glue, or their known substitutes, in the proportion of four ounces of soap or similar extractive matter, two ounces of glycerine or saccharine matter, or of both combined two ounces, dissolved in from two to four quarts of water; or, in lieu of the starch, gum-arabic, gum-senegal, dextrine, caseine, albumen, gluten, or a mixture of two or more of these ingredients may be used, and the material then treated with a lime solution, as before described. So, also, resinous gums may be dissolved in alkalies and used as a substitute for the starch.

The lime compound mixed with the gelatinous material may also be used in the form of a paint or paste for coating wood, leather, stones, metals, or other solid substances, either with or without the admixture of earthy substances to give it a body.

Vegetable fiber, when treated with the compound, may be manufactured into an almost endless variety of articles for use, and also for ornament.

In case it is desired to render the article soft and pliable, a larger proportion of the glycerine or saccharine matter or of the soapy material will be used.

It, of course, will be understood that in preparing the lime solution, acetic acid or any equivalent may be used instead of the vinegar, and that instead of the milk any known substitute may be used and the result still be the same.

Having thus described my invention, what I claim is—

The process, substantially as herein described, of treating fibrous and other materials for rendering them fire and water proof·

R. O. LOWREY.

Witnesses:
W. C. DODGE,
P. T. DODGE.